(12) United States Patent
Lin et al.

(10) Patent No.: US 7,997,507 B2
(45) Date of Patent: Aug. 16, 2011

(54) SUPPORTING DEVICE FOR SUPPORTING A FLAT PANEL DISPLAY DEVICE AND FLAT PANEL DISPLAY DEVICE ASSEMBLY

(75) Inventors: Tay-Yang Lin, Taipei Hsien (TW); Yu Zhang, Shenzhen (CN); Hai-Yang Yu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 266 days.

(21) Appl. No.: 12/420,012

(22) Filed: Apr. 7, 2009

(65) Prior Publication Data
US 2010/0163701 A1    Jul. 1, 2010

(30) Foreign Application Priority Data
Dec. 25, 2008 (CN) .......................... 2008 1 0306533

(51) Int. Cl.
*A47G 29/00* (2006.01)

(52) U.S. Cl. .................. 238/371; 248/274.1; 248/176.3; 248/133; 361/679.06; 361/679.21; 16/345

(58) Field of Classification Search .................. 248/371, 248/372.1, 157, 419, 420, 429, 176.1, 176.3, 248/205.1, 207, 309.1, 917, 918, 919, 920, 248/310, 274.1, 295.11, 298.1; 361/679.01, 361/679.02, 679.06, 679.21, 679.23, 681; 16/319, 327, 328, 343, 345, 352
See application file for complete search history.

(56) References Cited

U.S. PATENT DOCUMENTS

| 7,708,240 B2 * | 5/2010 | Homer et al. ................. 248/130 |
| 2009/0102744 A1 * | 4/2009 | Ram .............................. 345/1.1 |
| 2009/0141439 A1 * | 6/2009 | Moser ...................... 361/679.29 |

* cited by examiner

*Primary Examiner* — Terrell McKinnon
*Assistant Examiner* — Todd M. Epps
(74) *Attorney, Agent, or Firm* — Frank R. Niranjan

(57) ABSTRACT

A supporting device for supporting a flat panel display device includes a base, a sliding member, a supporting member, and a holding member. The base defines a pair of guiding grooves extending along a lengthwise direction of the base. The sliding member includes a first pedestal and a second pedestal. The first pedestal and the second pedestal are slidably received in the guiding grooves. The supporting member is hinged to the sliding member, and configured for supporting the flat panel display device. The holding member is slidably engaged with the base, and defines a holding cavity for receiving the supporting member.

18 Claims, 6 Drawing Sheets

SUPPORTING DEVICE FOR SUPPORTING A FLAT PANEL DISPLAY DEVICE AND FLAT PANEL DISPLAY DEVICE ASSEMBLY

BACKGROUND

1. Technical Field

The present disclosure relates to supporting devices.

2. Description of Related Art

A type of flat panel display (FPD) device includes a panel and a gravity sensor. The gravity sensor is configured for sensing the tilted direction of the panel. Therefore, when the panel is tilted, the gravity sensor can sense the titled direction of the panel, and the FPD devices can self-adjust the panel orientation to change the display mode according to the sensed titled direction for comfortable view. However, most FPD devices are limited in their tilt range and if a user tilts the device beyond its range, the FPD device can not self-adjust the orientation to change the display mode.

Therefore, what is desired is a supporting device for supporting flat panel display and flat panel display device assembly that can overcome the above-described problem.

DETAILED DESCRIPTION

Embodiments of the present supporting device will be now described in detail with reference to the drawings.

Figure 1:
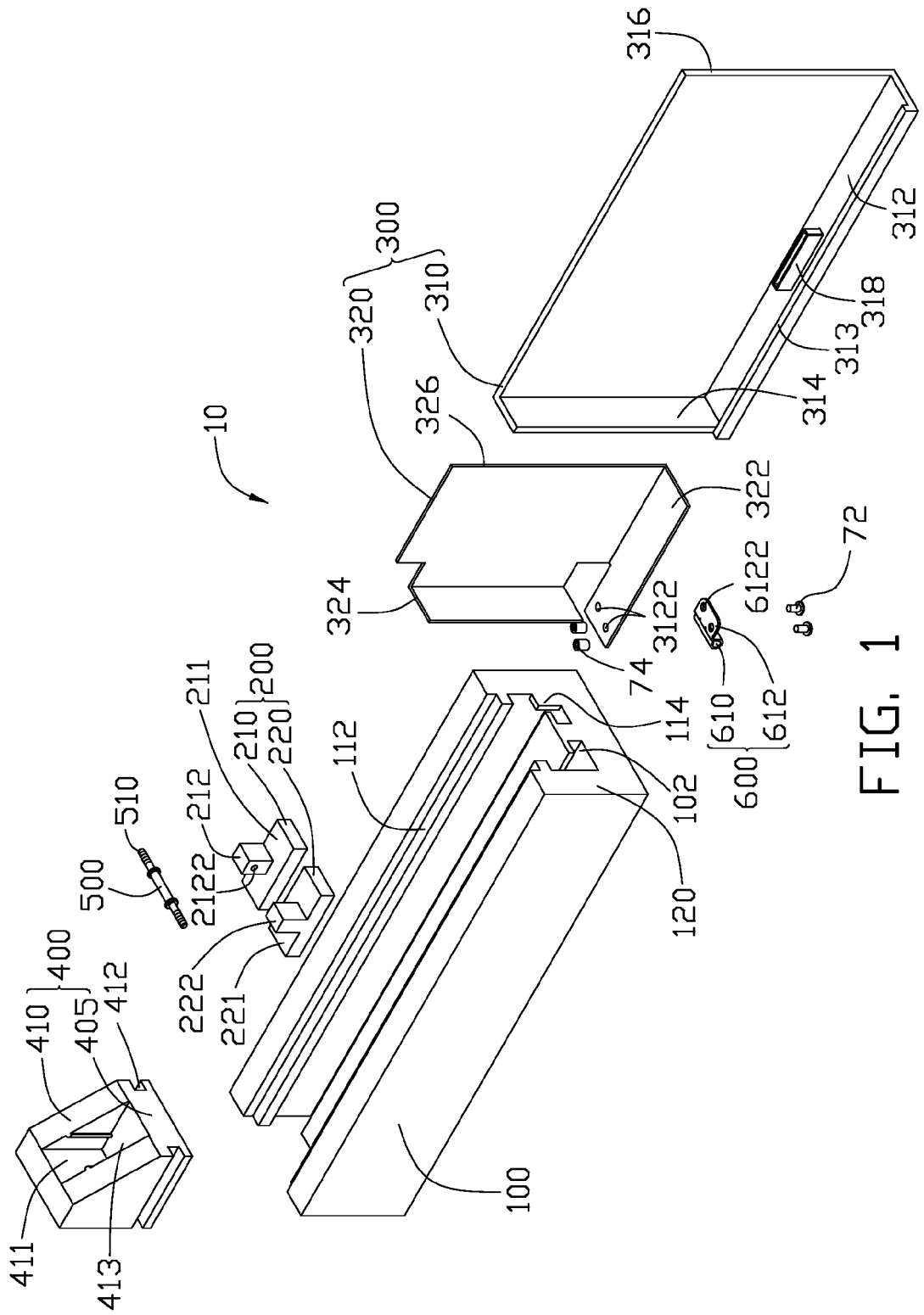
FIG. 1 is an exploded, isometric view of a supporting device, according to a first exemplary embodiment.
Figure 2:
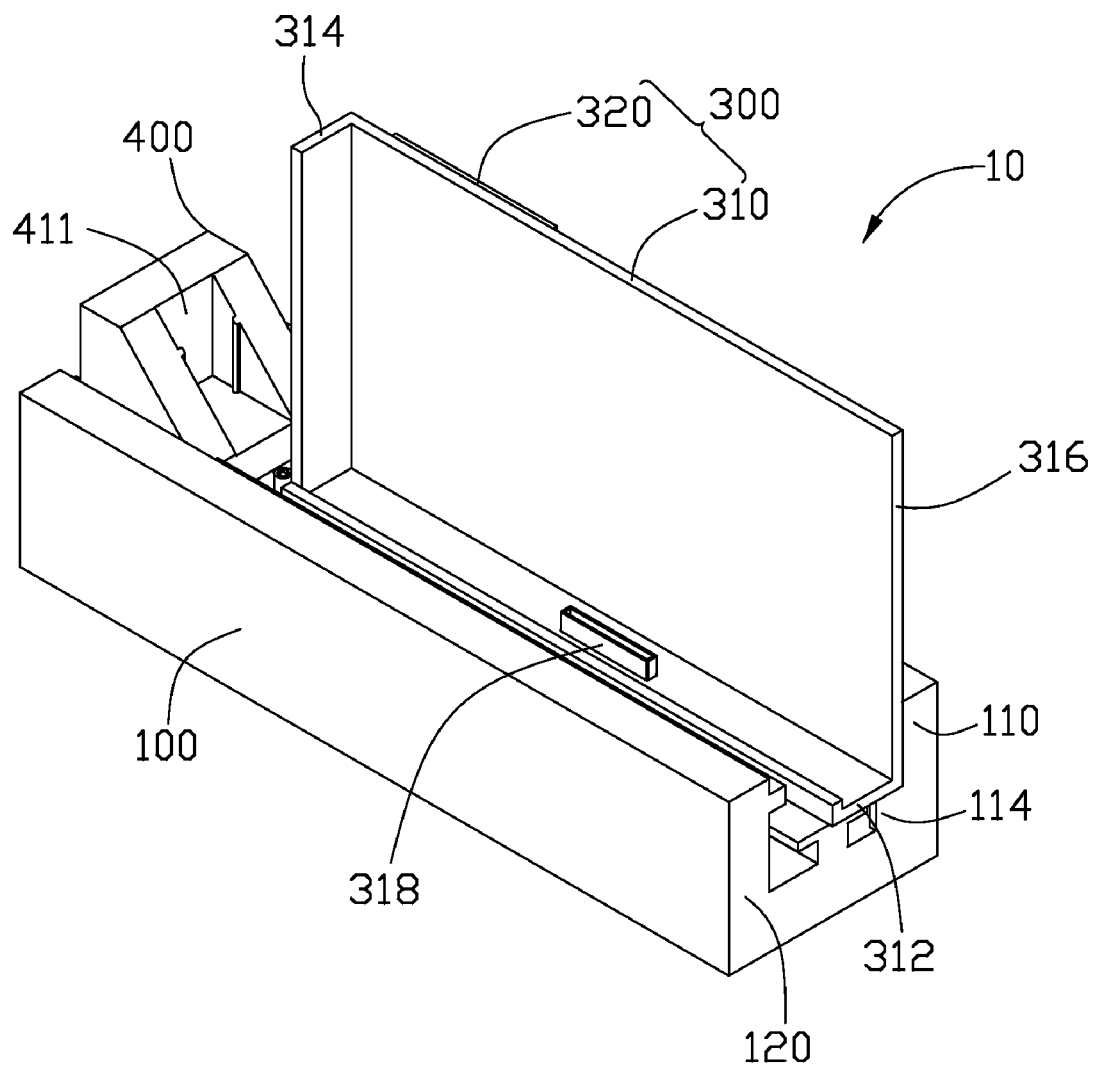
FIG. 2 is an assembled, isometric view of the supporting device of FIG. 1.

Referring to FIGS. 1 and 2, a supporting device 10 in accordance with a first exemplary embodiment is illustrated. The supporting device 10 includes a base 100, a sliding member 200, a supporting member 300, and a holding member 400. The supporting member 300 is hinged to the sliding member 200, and is configured for supporting a flat panel display device 20 (FPD, see FIG. 3). The holding member 400 is configured for receiving the supporting member 300. The sliding member 200, the supporting member 300 and the holding member 400 are slidably connected to the base 100.

The base 100 defines two symmetrical guiding grooves 102 extending along a lengthwise direction of the base 100, two symmetrical rails 112 above and parallel to the guiding groove 102, and an extending member 114 positioned at one end of one of the guiding grooves 102. In this embodiment, the extending member 114 is configured for supporting the supporting member 300.

The sliding member 200 includes a first pedestal 210 and a second pedestal 220. The first pedestal 210 and the second pedestal 220 are slidably received in the guiding grooves 102 symmetrically. In this embodiment, the slidable range of the first and second pedestals 210, 220 can be limited by the extending member 114 of the base 100, therefore, the extending member 114 can also prevent the first and second pedestals 210, 220 from sliding out of the rails 112. The first pedestal 210 includes a first main body 211 and a first shaft holding portion 212 substantially perpendicularly projecting from the first main body 211. The second pedestal 220 includes a second main body 221 and a second shaft holding portion 222 substantially perpendicularly projecting from the second main body 221. The first and second shaft holding portions 212, 222 define a pair of first threaded holes 2122.

The supporting member 300 includes a first support 310 and a second support 320. The first support 310 includes a first bottom plate 312, a first side-wall 314 projecting upward from the first bottom plate 312, a first back wall 316 adjacent to and substantially perpendicular to both the first bottom plate 312 and the first side-wall 314, and a latching member 318. The latching member 318 is mounted on the first bottom plate 312, and is configured to electrically connect to and mechanically latch to the FPD device 20 (see FIG. 3). The second support 320 includes a second bottom wall 322, a second back wall 326 adjacent to and substantially perpendicular to the second bottom wall 322, and a second side-wall 324 extending upward from and substantially perpendicular to the second back wall 326. The second bottom wall 322, the second side-wall 324 and the second back wall 326 are respectively mounted on the first bottom plate 312, the first side-wall 314, and the first back wall 316 to firmly attached to each other via an adhesive, as a result, the second support 320 is coupled to the first support 310. In other embodiment, the second support 320 can be coupled to the first support 310 by other means. In this embodiment, the first bottom plate 312 includes a rim 313 away from and substantially parallel to the first back wall 316. When the FPD 20 electrically connects to and latches to the supporting member 300 via the latching member 318, the rim 313 is configured for preventing the FPD 20 from toppling over the supporting member 300.

The holding member 400 includes a bottom plate 405 and a holding portion 410. The bottom plate 405 includes a supporting surface 413. The supporting surface 413 and the holding portion 410 cooperatively define a holding cavity 411 for receiving the supporting member 300. The bottom plate 405 defines two symmetrical guiding troughs 412 corresponding to the rails 112 of the base 100. The holding member 400 is disposed on the other end of the guiding grooves 102 away from the extending member 114 of the base 100. In this embodiment, the two rails 112 are inserted into the guiding troughs 412 via the pinch fitted method to firmly attach the holding member 400 onto the rails 112. The width of the holding cavity 411 is substantially equal to that of the second side-wall 324 of the second support 320 of the supporting member 300.

Alternatively, the pair of rails 112 can be defined on the holding member 400 and the pair of guiding troughs 412 can be accordingly defined in the base 100 to facilitate the fixing of the holding member 400 to the base 100. It should be noted that the two rails 112 of the base 100 can also be slidably engaged in the guiding troughs 412. As a result, the holding member 400 is slidable along the rail 112 to facilitate adjusting the holding member 400 to a predetermined location.

The supporting device 10 further includes a rotatable shaft 500, a connecting member 600, two screws 72, and two nuts 74. The rotatable shaft 500 includes two screw threaded ends 510 and is configured for fixing the supporting member 300 onto the sliding member 200. The connecting member 600 is configured for connecting the supporting member 300 and the rotatable shaft 500. The connecting member 600 includes a knuckle 610 and a mounting plate 612. The mounting plate 612 defines a pair of second threaded holes 6122. Accordingly, the second bottom wall 322 of the second support 320 defines a pair of third threaded holes 3122 aligned with the second threaded hole 6122 correspondingly. The connecting member 600 is assembled onto the second support 320 by inserting the screws 72 through the second and third threaded holes 3122, 6122, and engaged with the two nuts 74 correspondingly. The screw threaded ends 510 of the rotatable shaft 500 is inserted into the knuckle 610 of the connecting member 600, and is engaged in the first threaded holes 2122 of the first and second pedestals 210, 220, thereby, fixing the supporting member 300 onto the sliding member 200. In this embodiment, the top surface of the extending member 114 of the base 100, and the rotatable shaft 500 are at the same plane.

In assembly, firstly, the supporting member 300 are assembled onto the first and second pedestal 210, 220 of the sliding member 200 via the rotatable shaft 500 and the connecting member 600. Secondly, the first and second pedestals 210, 220 are slidably received in the guiding grooves 102 of the base 100 symmetrically. Finally, the holding member 400 is fixed on the base 100 via the matching of the guiding troughs 412 and the rails 112 of the base 100.

Figure 3:
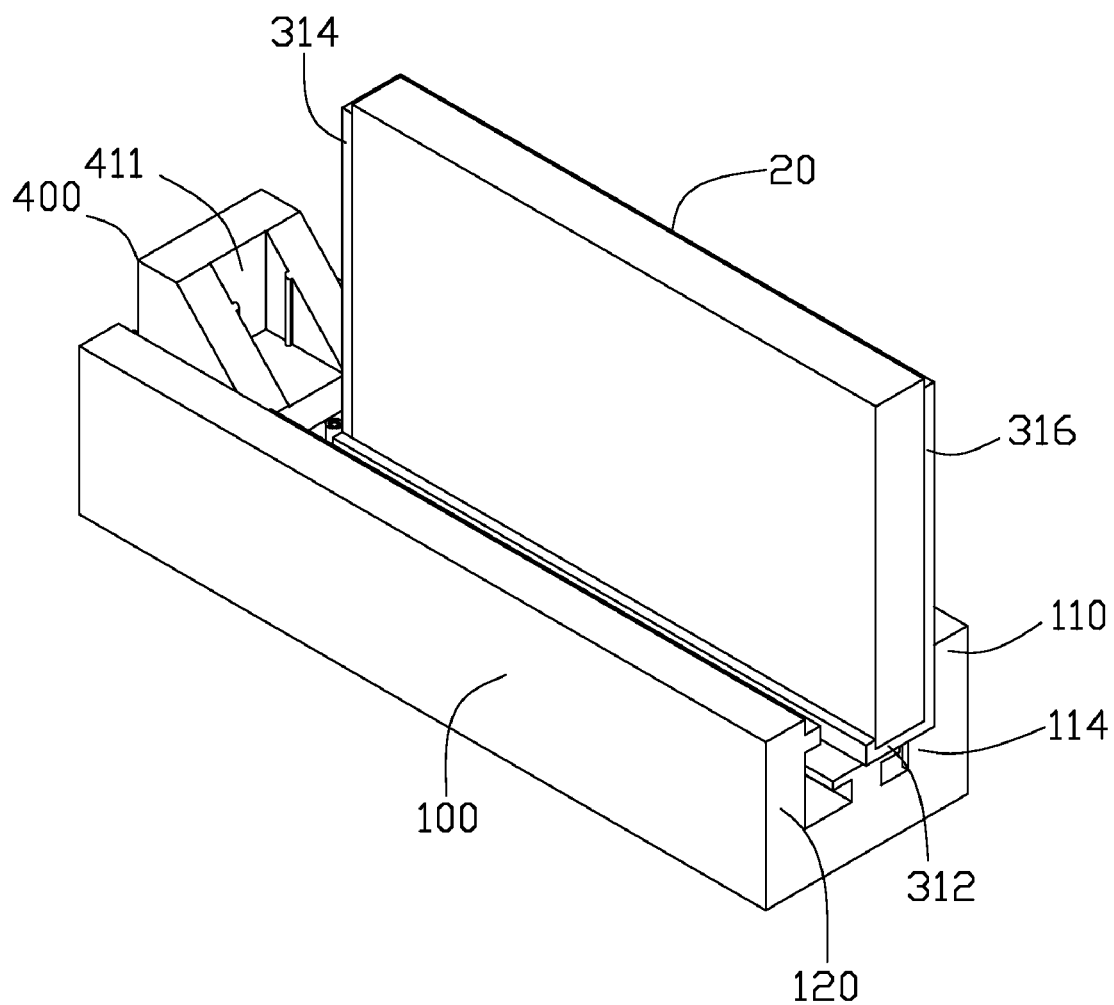
FIG. 3 is an isometric view of the supporting device of FIG. 1, where a flat panel display (FPD) device is held by the supporting device in a first state.
Figure 4:
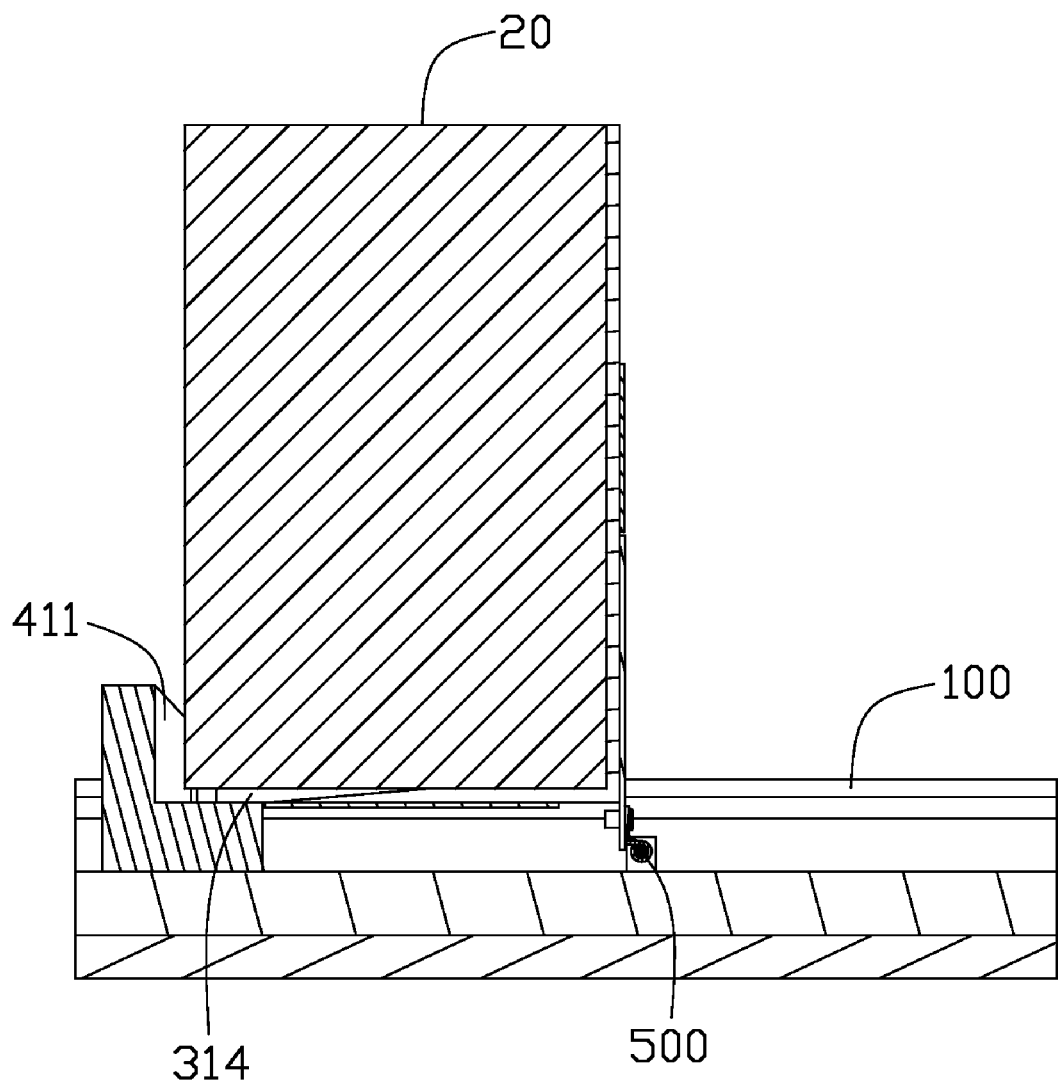
FIG. 4 is similar to FIG. 3, but showing the FPD device supported in a second state.

Further referring to FIGS. 3-4, in operation, the FPD 20 is electrically connected to and latched to the supporting member 300 via the latching member 318, and initially the first side-wall 314 of the first support 310 is placed substantially perpendicular to the rails 112 of the base 100. Then, if the orientation of the FPD 20 needs to be changed, the supporting member 300 is slid along the guiding groove 102, away from the holding member 400 to a predetermined position, and the supporting member 300 is rotated about the rotatable shaft 500 toward the holding member 400 until the supporting member 300 is received by the holding cavity 411 of the holding member 400 and the second side-wall 324 is supported on the supporting surface 413 of the bottom plate 405. As a result, the FPD 20 is rotated counterclockwise about 90 degrees, and the first side-wall 314 of the first support 310 is oriented substantially parallel to the rails 112 of the base 100.

In this embodiment, the FPD 20 is electrically connected to and mechanically latching to the supporting member 300, the supporting member 300 can be rotated relative to the base 100, and the supporting member 300 is held by the holding member 400, as a result, the range of movement of the FPD 20 is increased.

Figure 5:
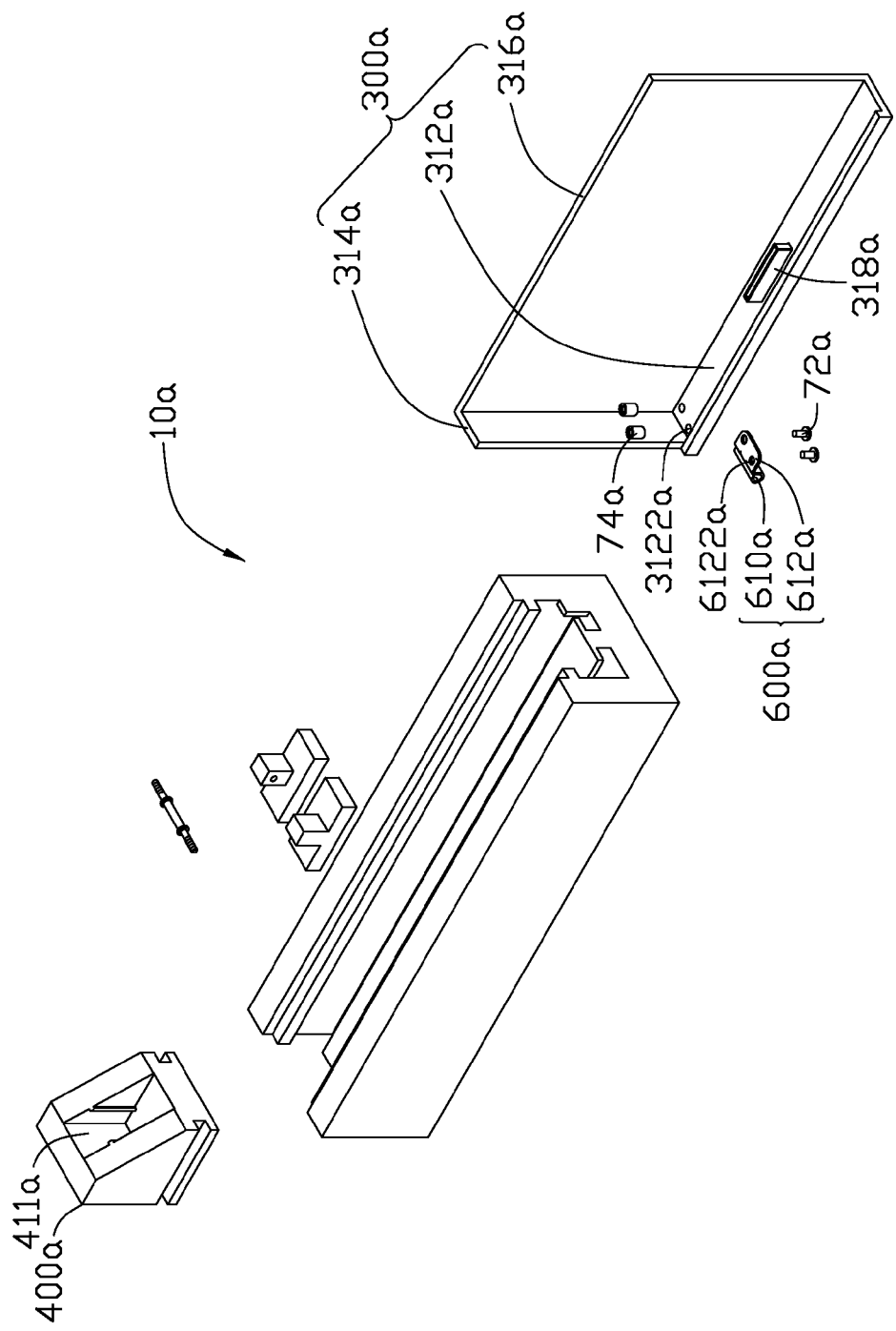
FIG. 5 is an exploded, isometric view of a supporting device, according to a second exemplary embodiment.
Figure 6:
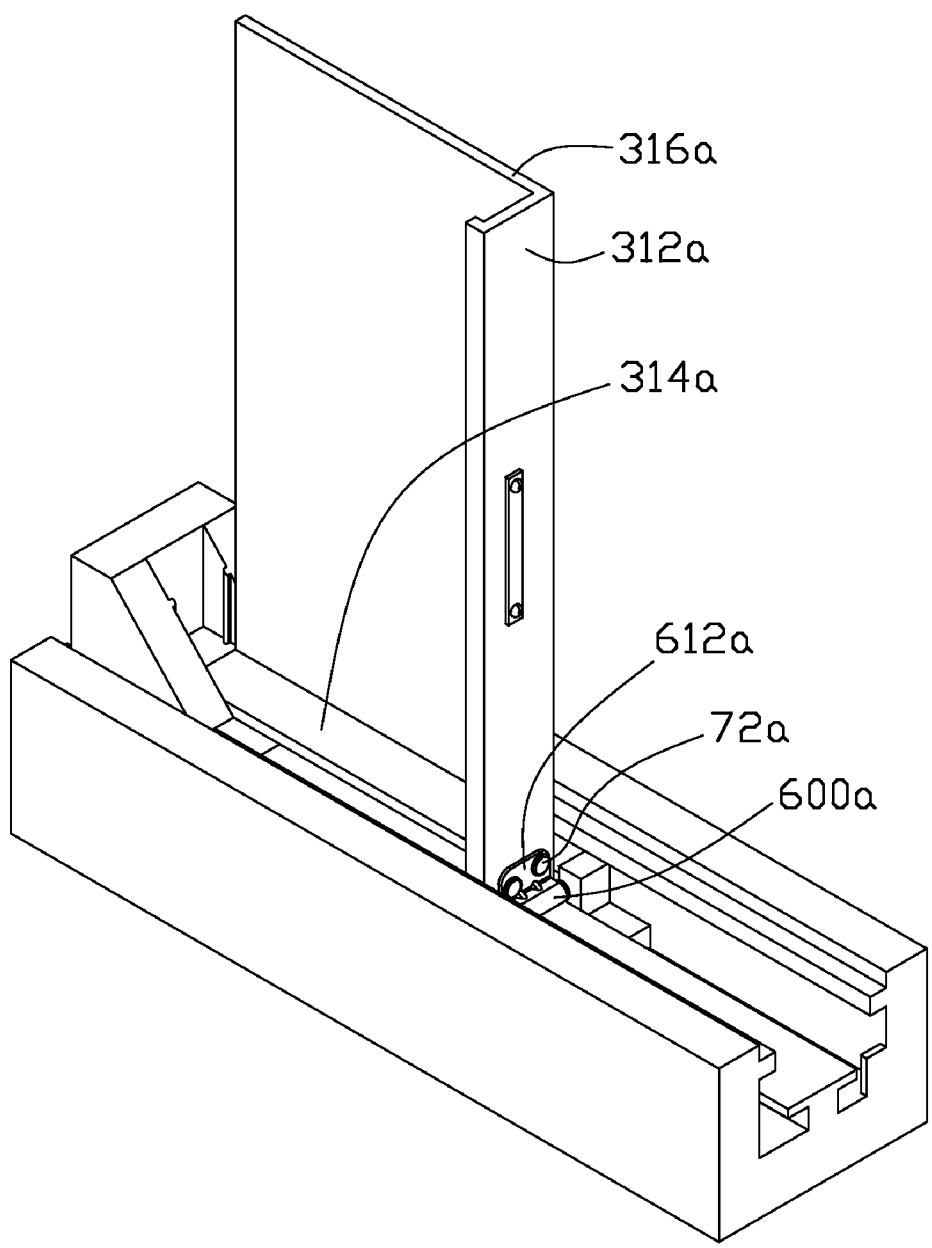
FIG. 6 is an assembled, isometric view of the supporting device of FIG. 5.

Referring to FIGS. 5-6, a supporting device 10a in accordance with a second exemplary embodiment is disclosed. The supporting device 10a is essentially similar to the supporting device 10 of FIG. 1, except for the supporting member. In this embodiment, the supporting member only includes the first support 300a. The first support 300a includes a first bottom plate 312a, a first side-wall 314a, a first back wall 316a, and a latching member 318a. The first side-wall 314a is adjacent to and substantially perpendicular to the first bottom plate 312a. The first back wall 316a is adjacent to and substantially perpendicular to both the first bottom plate 312a and the first back wall 316a. The latching member 318a is mounted on the first bottom plate 312a. The first bottom plate 312a defines a pair of third threaded holes 3122a, the two screws 72a are inserted through the second and third threaded holes 6122a, 3122a, and engaged with the two nuts 74a to assemble the connecting member 600a onto the first bottom plate 312a of the first support 300a. The width of the holding cavity 411a of the holding member 400 is substantially equal to that of the first side-wall 314a of the first support 300a.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A supporting device for supporting a flat panel display device, the supporting device comprising:
   a base defining two guiding grooves extending along a lengthwise direction of the base;
   a sliding member comprising a first pedestal and a second pedestal, the first pedestal and the second pedestal slidably received in the guiding grooves;
   a supporting member being hinged to the sliding member, and configured for supporting the flat panel display device; and
   a holding member slidably engaged with the base, and defined a holding cavity for receiving the supporting member.

2. The supporting device as claimed in claim 1, wherein the base comprises an extending member positioned at one end of one of the guiding grooves and configured for supporting the supporting member and limiting the slidable range of the first and second pedestals.

3. The supporting device as claimed in claim 1, wherein the holding member comprises a bottom plate and a holding portion; the bottom plate comprises a supporting surface; the holding cavity is cooperatively defined by the supporting surface and the holding portion.

4. The supporting device as claimed in claim 1, wherein the first pedestal comprises a first main body and a first shaft holding portion substantially perpendicularly projecting from the first main body; and the second pedestal comprises a second main body and a second shaft holding portion substantially perpendicularly projecting from the second main body; the first and second shaft holding portions define a pair of first threaded holes; the supporting device further comprises a rotatable shaft and a connecting member comprising a knuckle and a mounting plate; the mounting plate defines a pair of second threaded holes; the supporting member defines a pair of third threaded holes each aligned with a corresponding second threaded holes, two screws are inserted through the second and third threaded holes, and engaged with two nuts to assemble the connecting member onto the supporting member, the rotatable shaft comprises two screw threaded ends, the rotatable shaft is inserted into the knuckle of the connecting member, and is engaged in the first threaded holes and fixed between the first and second pedestals, and the top surfaces of the extending member of the base and the rotatable shaft are at the same plane.

5. The supporting device as claimed in claim 1, wherein the supporting member comprises a first support and a second support, and the second support is mounted on the first support.

6. The supporting device as claimed in claim 5, wherein the first support comprises a first bottom plate and a first side-wall projecting upward from the first bottom plate, a first back wall adjacent to and substantially perpendicular to both the first bottom plate and the first side-wall, and a latching member mounted on the first bottom plate; the latching member is configured for electrically connecting to and mechanically latching to the flat panel display device; the second support comprises a second bottom wall, a second back wall adjacent to and substantially perpendicular to the second bottom wall, and a second side-wall extending upward from and substantially perpendicular to the second back wall; the second bottom wall is mounted on the first bottom plate; the second side-wall is mounted on the first side-wall, the second back wall is mounted on the first back wall.

7. The supporting device as claimed in claim 1, wherein the supporting member comprises a first support, the first support comprises a first bottom plate, a first side-wall, a first back wall, and a latching member, the latching member is mounted on the first bottom plate.

8. The supporting device as claimed in claim 6, wherein the width of the holding cavity of the holding member is substantially equal to that of the second side-wall of the second support of the supporting member.

9. The supporting device as claimed in claim 7, wherein the width of the holding cavity of the holding member is substantially equal to that of the first side-wall of the first support.

10. A flat panel display device assembly, comprising:
a flat panel display device; and
a support device comprising:
   a base defining two guiding grooves extending along a lengthwise direction of the base;
   a sliding member comprising a first pedestal and a second pedestal, the first pedestal and the second pedestal slidably received in the guiding grooves;
   a supporting member being hinged to the sliding member, and configured for supporting the flat panel display device; and
   a holding member slidably engaged with the base, and defined a holding cavity for receiving the supporting member.

11. The flat panel display device assembly as claimed in claim 10, wherein the base comprises an extending member positioned at one end of one of the guiding grooves and configured for supporting the supporting member and limiting the slidable range of the first and second pedestals.

12. The flat panel display device assembly as claimed in claim 10, wherein the holding member comprises a bottom plate and a holding portion, the bottom plate comprises a supporting surface; the holding cavity is cooperatively defined by the supporting surface and the holding portion.

13. The flat panel display device assembly as claimed in claim 10, wherein the first pedestal comprises a first main body and a first shaft holding portion substantially perpendicularly projecting from the first main body; and the second pedestal comprises a second main body and a second shaft holding portion substantially perpendicularly projecting from the second main body; the first and second shaft holding portions define a pair of first threaded holes; the supporting device further comprises a rotatable shaft and a connecting member comprising a knuckle and a mounting plate; the mounting plate defines a pair of second threaded holes; the supporting member defines a pair of third threaded holes each aligned with a corresponding second threaded holes; two screws are inserted through the second and third threaded holes, and engaged with two nuts to assemble the connecting member onto the supporting member, the rotatable shaft comprises two screw threaded ends, the rotatable shaft is inserted into the knuckle of the connecting member, and is engaged in the first threaded holes and fixed between the first and second pedestals, and the top surfaces of the extending member of the base and the rotatable shaft are at the same plane.

14. The flat panel display device assembly as claimed in claim 10, wherein the supporting member comprises a first support and a second support, and the second support is mounted on the first support.

15. The flat panel display device assembly as claimed in claim 14, wherein the first support comprises a first bottom plate and a first side-wall projecting upward from the first bottom plate; a first back wall adjacent to and substantially perpendicular to both the first bottom plate and the first side-wall; and a latching member mounted on the first bottom plate; the latching member is configured for electrically connecting to and mechanically latching to the flat panel display device, the second support comprises a second bottom wall, a second back wall adjacent to and substantially perpendicular to the second bottom wall, and a second side-wall extending upward from and substantially perpendicular to the second back wall; the second bottom wall is mounted on the first bottom plate, the second side-wall is mounted on the first side-wall, the second back wall is mounted on the first back wall.

16. The flat panel display device assembly as claimed in claim 10, wherein the supporting member comprises a first support, the first support comprises a first bottom plate, a first side-wall, a first back wall, and a latching member, the latching member is mounted on the first bottom plate.

17. The flat panel display device assembly as claimed in claim 15, wherein the width of the holding cavity of the holding member is substantially equal to that of the second side-wall of the second support of the supporting member.

18. The flat panel display device assembly as claimed in claim 16, wherein the width of the holding cavity of the holding member is substantially equal to that of the first side-wall of the first support.

* * * * *